(12) United States Patent
Hong et al.

(10) Patent No.: US 9,043,300 B2
(45) Date of Patent: May 26, 2015

(54) INPUT METHOD EDITOR INTEGRATION

(75) Inventors: Feng Hong, Foster City, CA (US); Yuke Zhao, Mountain View, CA (US); Quji Guo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 776 days.

(21) Appl. No.: 12/595,215

(22) PCT Filed: Apr. 9, 2008
(Under 37 CFR 1.47)

(86) PCT No.: PCT/US2008/059760
§ 371 (c)(1),
(2), (4) Date: Jan. 18, 2011

(87) PCT Pub. No.: WO2008/127939
PCT Pub. Date: Oct. 23, 2008

(65) Prior Publication Data
US 2011/0173172 A1 Jul. 14, 2011

Related U.S. Application Data

(60) Provisional application No. 60/911,279, filed on Apr. 11, 2007.

(30) Foreign Application Priority Data

Apr. 16, 2007 (CN) .......................... 2007 1 0101819

(51) Int. Cl.
*G06F 17/30* (2006.01)
*G06F 3/023* (2006.01)
(Continued)

(52) U.S. Cl.
CPC .............. *G06F 3/0237* (2013.01); *G06F 3/018* (2013.01); *G06F 17/276* (2013.01); *G06F 17/2863* (2013.01)

(58) Field of Classification Search
USPC .......................................... 707/706; 715/205
See application file for complete search history.

(56) References Cited

U.S. PATENT DOCUMENTS

| | | | |
|---|---|---|---|
| 5,432,948 A | | 7/1995 | Davis et al. |
| 5,594,642 A | * | 1/1997 | Collins et al. ................. 715/236 |

(Continued)

FOREIGN PATENT DOCUMENTS

| | | |
|---|---|---|
| CN | 1457002 A | 11/2003 |
| CN | 1797301 A | 7/2006 |

(Continued)

OTHER PUBLICATIONS

Korean Examiner Seok Hyung Lee, Notification of Transmittal of the International Search Report and the Written Opinion of the International Searching Authority, or the Declaration for Application No. PCT/US2008/059760, dated Aug. 27, 2008, 11 pages.

(Continued)

*Primary Examiner* — Shyue Jiunn Hwa
(74) *Attorney, Agent, or Firm* — Remarck Law Group PLC

(57) ABSTRACT

Methods, systems, and apparatus, including computer program products, in which an input method editor receives composition inputs in an input method editor environment, the composition inputs based on user inputs. Candidate selections are identified in the input method editor environment based on the composition inputs. Each candidate selection comprises one or more ideograms. The input method editor environment receives a search command based on a user input, and selects one of the candidate selections in response to the search command. The selected candidate selection and the search command are provided to a search engine interface external to the input method editor environment.

17 Claims, 3 Drawing Sheets

(51) Int. Cl.
*G06F 3/01* (2006.01)
*G06F 17/27* (2006.01)
*G06F 17/28* (2006.01)

(56) References Cited

U.S. PATENT DOCUMENTS

| | | | |
|---|---|---|---|
| 5,952,942 A * | 9/1999 | Balakrishnan et al. | 341/20 |
| 6,073,146 A * | 6/2000 | Chen | 715/264 |
| 6,101,461 A | 8/2000 | Ukigawa et al. | |
| 6,173,253 B1 * | 1/2001 | Abe et al. | 704/10 |
| 6,362,752 B1 * | 3/2002 | Guo et al. | 341/28 |
| 6,401,060 B1 * | 6/2002 | Critchlow et al. | 704/1 |
| 6,418,239 B1 * | 7/2002 | Hullender et al. | 382/229 |
| 6,822,585 B1 * | 11/2004 | Ni et al. | 341/28 |
| 7,013,258 B1 * | 3/2006 | Su et al. | 704/1 |
| 7,099,876 B1 | 8/2006 | Hetherington et al. | |
| 7,174,288 B2 | 2/2007 | Ju et al. | |
| 7,197,184 B2 | 3/2007 | Repka | |
| 7,302,640 B2 | 11/2007 | Lee et al. | |
| 7,616,190 B2 | 11/2009 | Li et al. | |
| 8,024,319 B2 * | 9/2011 | Gao et al. | 707/711 |
| 2002/0168107 A1 * | 11/2002 | Tang et al. | 382/187 |
| 2003/0212563 A1 * | 11/2003 | Ju et al. | 704/277 |
| 2005/0080612 A1 * | 4/2005 | Chai et al. | 704/5 |
| 2005/0209844 A1 * | 9/2005 | Wu et al. | 704/2 |
| 2006/0146024 A1 | 7/2006 | Chen | |

FOREIGN PATENT DOCUMENTS

| | | |
|---|---|---|
| JP | 5189439 A | 7/1993 |
| JP | 7129565 A | 5/1995 |
| JP | 10301922 A | 11/1998 |
| JP | 2001229156 A | 8/2001 |
| JP | 2002073878 A | 3/2002 |
| JP | 2002123510 A | 4/2002 |
| JP | 2003514304 A | 4/2003 |
| JP | 2004118462 A | 4/2004 |
| JP | 2004191265 A | 7/2004 |
| JP | 2005346709 A | 12/2005 |
| JP | 2006040263 A | 2/2006 |
| TW | 200622711 A | 7/2006 |

OTHER PUBLICATIONS

Chinese Office Action regarding Patent Application No. 200710101819.7, dated Sep. 6, 2011, 16 pgs.

* cited by examiner

INPUT METHOD EDITOR INTEGRATION

This application claims the benefit of priority of U.S. Provisional Patent application No. 60/911,279, filed on Apr. 11, 2007, and China application no. 200710101819.7. filed Apr. 16, 2007, the entire disclosures of which are incorporated herein by reference.

BACKGROUND

This disclosure relates to input methods.

Languages that use a logographic script in which one or two characters correspond roughly to one word or meaning have more characters than keys on a standard input device, such as a computer keyboard or a mobile device keypad. For example, the Chinese language contains tens of thousands of characters having pronunciations defined by base Pinyin elements and five tones. The mapping of these potentially many-to-one associations can be implemented by input methods that facilitate entry of characters and symbols not found on input devices. Accordingly, a Western style keyboard can be used to input Chinese characters. Likewise, input methods can be used for using a Western style keyboard or some other input device to input many other languages that include ideograms, such as the Japanese language, the Korean language, and other languages.

An input method editor user interface may be associated with an input method editor. Often a user may desire to utilize the input method editor to generate characters, e.g., Hanzi characters, and input the characters into another application, e.g., a search engine input field. For example, a user may open a browser and access a search engine interface, and then open an input method editor and enter a Chinese query in the input method editor environment, e.g., the input method editor user interface. The user may have to select a particular set of characters in the input method editor environment and then activate a search command in the search engine interface.

The repetition of the manual selections and/or switching operations can be detrimental to a user experience. Eliminating one or more of these manual selections and/or switching operations can thus improve the user experience.

SUMMARY

This specification describes technologies related to input method editors. In some implementations, an input method editor receives composition inputs in an input method editor environment. The composition inputs are based on user inputs. Candidate selections are identified in the input method editor environment based on the composition inputs. Each candidate selection comprises one or more ideograms. The input method editor environment receives a search command based on a user input, and selects one of the candidate selections in response to the search command. The selected candidate selection and the search command are provided to a search engine interface external to the input method editor environment.

In some implementations, an input method editor data store stores integration commands, each integration command identifying an integration of the input method editor with a corresponding application environment that is external to an input method editor user interface. Candidate selections based on one or more composition inputs can be identified in the input method editor user interface. The input method editor user interface receives an integration command based on a user input, and one of the candidate selections is selected in response to the integration command. The selected candidate selection is provided to the corresponding application environment external to the input method editor user interface.

In some implementations, a system includes a data store storing one or more input method editor data store integration commands. Each integration command identifies an integration of an input method editor with a corresponding application instance that is external to an input method editor user interface. The system also includes a plurality of application interfaces. Each application interface is associated with one of the corresponding application instances and configured to facilitate data communication from an input method editor to the application instance. The system also includes an input method editor configured to identify candidate selections based on one or more composition inputs and, in response to receiving an integration command associated with an application interface, access the application interface, select one of the candidate selections and provide the selected candidate selection to the corresponding application instance associated with the application interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
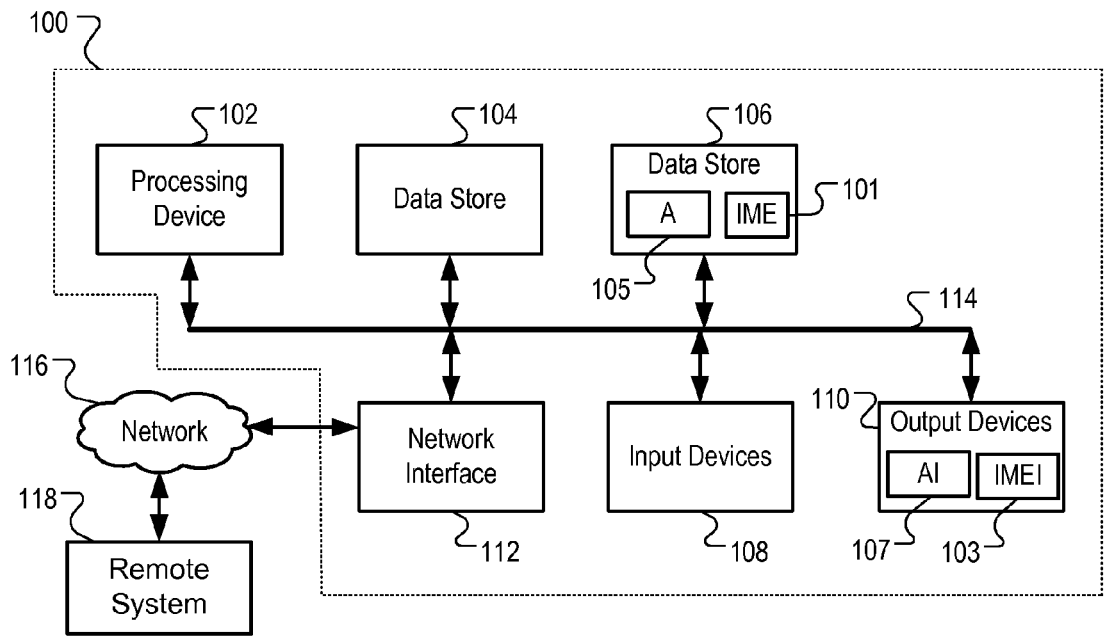
FIG. 1 is a block diagram of an example device that can be utilized to implement the systems and methods described herein.

FIG. 1 is a block diagram of an example device 100 that can be utilized to implement the systems and methods described herein. The example device 100 can, for example, be a computer device, such as a personal computer device, or other electronic devices, such as a mobile phone, mobile communication device, personal digital assistant (PDA), and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor (IME) code 101 in a data store, such as the data store 106. The input method editor code 101 can include instructions that upon execution cause the processing device 102 to carry out input method editing functions. The input method editor code 101 can, for example, comprise interpreted instructions, such as script instructions, e.g., JavaScript or ECMAScript instructions, that can be executed in a web browser environment. Other implementations can also be used, e.g., a stand-alone application, an applet, a plug-in module, etc.

Execution of the input method editor code 101 generates or launches an input method editor instance (IMEI) 103. The input method editor instance 103 can define an input method editor environment, e.g., user interface, and can facilitate the processing of one or more input methods at the device 100, during which time the device 100 can receive composition inputs for input characters, ideograms, or symbols, such as, for example, Hanzi characters. For example, the user can use one or more of the input devices 108 (e.g., a keyboard, such as a Western-style keyboard, a stylus used with a handwriting recognition engine, etc.) to input composition inputs for identification of Hanzi characters. In some examples, a Hanzi character can be composed of more than one composition input.

The first data store 104 and/or the second data store 106 can store an association of composition inputs and characters. Based on a user input, the input method editor instance 103 can use information in the data store 104 and/or the data store 106 to identify one or more candidate selections represented by the input. In some implementations, if more than one candidate selection is identified, the candidate selections are displayed on an output device 110. Using the input device 108, the user can select from the candidate selections a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to one or more keystrokes in the Western-style keyboard. Using a Pinyin input method editor, a user can input a Hanzi character by using composition inputs that includes one or more Pinyin syllables representing the sound of the Hanzi character. Input methods for other languages, however, can also be facilitated.

Other application software 105 can also be stored in data stores 104 and/or 106, including web browsers, word processing programs, e-mail clients, etc. Each of these applications can generate a corresponding application instance (AI) 107. Each application instance can define an environment that can facilitate a user experience by presenting data to the user and facilitating data input from the user. For example, web browser software can generate a search engine environment; e-mail software can generate an e-mail environment; a word processing program can generate an editor environment; etc.

In some implementations, a remote computing system 118 having access to the system 100 can also be used to edit a logographic script. For example, the system 100 may be a server that provides logographic script editing capability via the network 116. In one example, a user can edit a logographic script stored in the data store 104 and/or the data store 106 using a remote computing system, e.g., a client computer. The system 100 can, for example, select a character and receive a composition input from a user over the network interface 112. The processing device 102 can, for example, identify one or more characters adjacent to the selected character, and identify one or more candidate selections based on the received composition input and the adjacent characters. The system 100 can transmit a data communication that includes the candidate selections back to the remote computing system.

Figure 2:
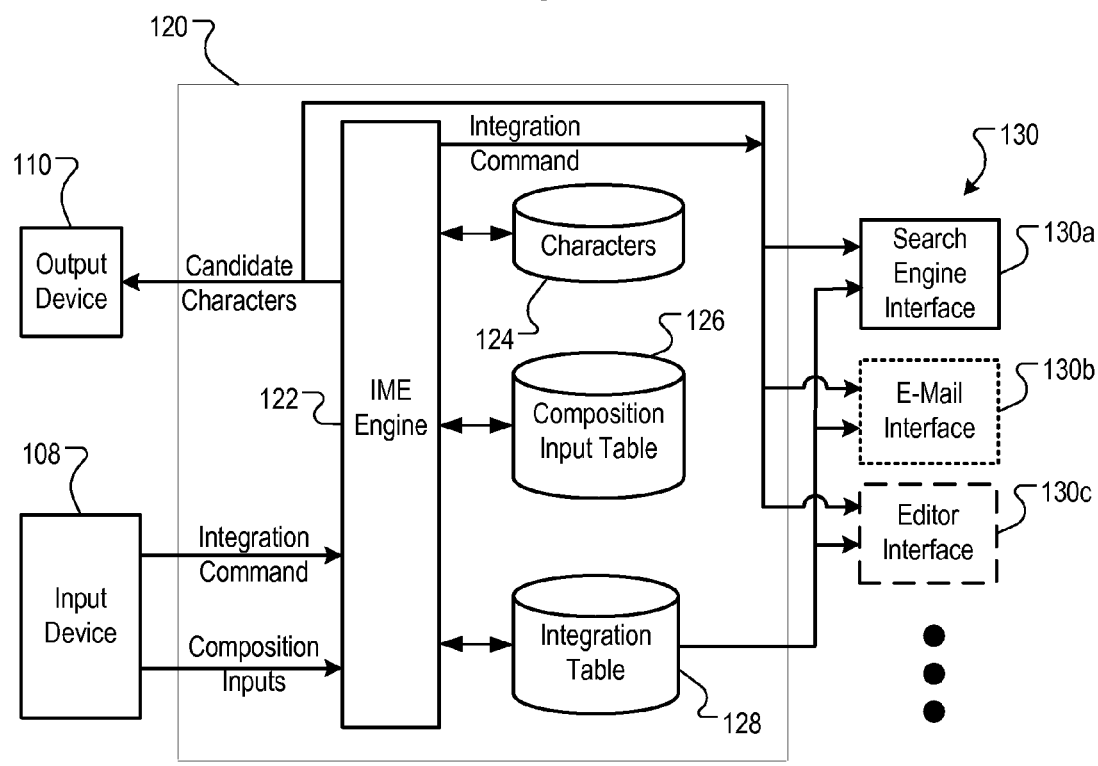
FIG. 2 is a block diagram of an example input method editor system.

FIG. 2 is a block diagram of an example input method editor system 120. The input method editor system 120 can, for example, be implemented using the input method editor code 101 and associated data stores 104 and 106. The input method editor system 120 includes an input method editor engine 122, a character data store 124, a composition input data store 126, and an integration table 128. Other storage architectures can also be used. The character data store 124 includes characters of a logographic script used in one or more language models, and characters and words in Roman-based or western-style alphabets, e.g., English, German, Spanish, etc. In some implementations, the character data store 124 also includes information about relationships between characters. For example, the character data store 124 can include scores or probability values assigned to a character depending on characters adjacent to the character. Other contextual relation data can also be used.

The composition input data store 126 includes an association of composition inputs and the characters stored in the character data store 124. In some implementations, the composition input data store 126 can link each of the characters in the character data store 124 to a composition input used by the input method editor engine 122. For example, the input method editor engine 122 can use the information in the character data store 124 and the composition input data store 126 to associate and/or identify one or more characters in the character data store 124 with one or more composition inputs in the composition input data store 126.

The integration table data store 128 can store integration command data related to integration commands. Each integration command can, for example, identify an integration of the input method editor 120 with a corresponding application interface 130. The application interface 130 can facilitate communication with a corresponding application or application environment that is external to the input method editor instance 103 environment.

In some implementations, an application interface 130 can include instructions, e.g., a script or compiled code, and can be invoked based on the integration command received. In some implementations, the application interfaces 130 can be stored in a data store associated with an application, and the integration table 128 can include data identifying and providing access to the corresponding application interface 130. For example, a search engine interface 130a can be a script stored in a browser cache; an e-mail interface 130b can be a script stored in an e-mail cache; and an editor interface 130c can be compiled code stored in an editor data store.

Other implementations can also be used. For example, the application interfaces 130 can be application program interfaces to corresponding applications, or can be an integration with an application user interface, for example.

The input method editor instance 103 can, for example, receive in the input method editor user interface an integration command. The integration command can be based on a user input and received from a user device 108. In response to the integration command, one of the candidate selections can be selected and provided to an application interface 130 with the integration command. The application interface 130 can facilitate communication with an application or application environment that is external to the input method editor instance 103 environment.

For example, if the integration command is a search command, and the integration table 128 defines the search command to be associated with the search engine interface 130*a*, then one of the candidate selections can be selected in response to the search command and provided with the search command to a search engine interface 130*a*. The search engine interface 130*a* can, for example, provide the candidate selection as input to a search engine and the search command can invoke a search function that utilizes the candidate selection as query data. In some implementations, the integration command is invoked in the input method editor interface, e.g., by a corresponding integration command activation element, e.g. a button, or key stroke.

In some implementations, the input method editor 120, in response to the search command, can determine if a corresponding application interface 130 is active. For example, in response to a search command, input method editor 120 can determine if the search engine interface 130*a*, e.g., a search engine environment, or a search engine program interface, is active. If the search engine interface 130 is determined to be active, the selected candidate selection can be provided to the search engine interface 130*a* as a search input, and a search can be invoked through the search engine interface 130*a* that causes a search engine to perform a search based on the selected candidate selection.

If the search engine interface 130 is determined to not be active, the input method editor 120 can, for example, instantiate the search engine interface to provide the selected candidate selection and search command.

Figure 3:
FIGS. 3-5 are screen shots of an example input method editor environment.

In some implementations, the candidate selections in the input method editor 120 can be ranked and presented in the input method editor according to the rank. For example, FIG. 3 shows an example input method editor environment 300 presenting five ranked candidate selections 302. The candidate selections 302 are identified based on the Pinyin inputs 304. An integration command button 306, e.g., a search command button 306, is also displayed in the input method editor environment. A selection indicator 308 surrounds the first candidate selection, i.e., 谷歌, indicating that the first candidate selection will be selected in response to an activation of the search command button 306. In some implementations, first candidate selection can be selected by default upon activation of the search command button.

Figure 4:
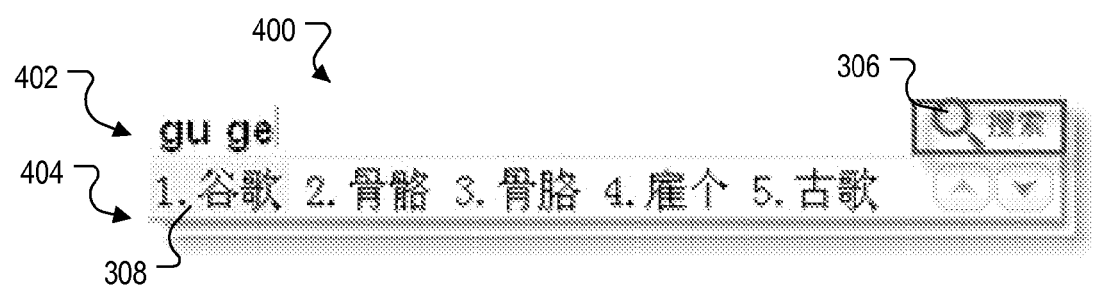

As shown in FIG. 4, the search command button 306 has been activated, and thus the first candidate selection 谷歌 has been provided to a search engine as an input query for a search function.

Figure 5:

In some implementations, a user can manually select a candidate selection. For example, a user may desire to invoke a search on a query defined by the second candidate selection. As shown in FIG. 5, the user can, for example, utilize up and down arrow keys to move the selection indicator 308 to select the second candidate selection. Accordingly, activation of the search command button 306 will provide the second candidate selection and a search command to a search engine.

In some implementations, the integration command can be invoked by a keyboard input. For example, a Ctrl-G input can be used to input an integration command.

Although only one integration command button 306 is shown, additional integration command buttons can also be included in the input method environment, e.g., an integration command button for an e-mail program could also be included in the input method environment. Accordingly, multiple integration command buttons can be displayed at the same time to facilitate processing of different integration commands from a single environment.

In some implementations, one or more integration commands that are made available can be determined by an identified context during runtime, e.g., a set Chinese candidate selections during runtime may examined to determine which integration commands are instantiated. For example, if a user types an input for a city name, an integration command to obtain current weather data of the city may appear; if user types an input for a stock name, an integration command to obtain a stock quote for the stock name may appear, etc. Accordingly, a context defined by candidate selections can be identified, and integration commands related to the identified context can also be identified. The integration commands can thus be enabled based on the context during runtime.

While an example integration with a browser and search engine environment has been described, other integrations can also be realized. For example, any external application that can process an input method input or an ideogram input can be integrated with an input method editor, e.g., an e-mail application, a programming application, etc.

Figure 6:
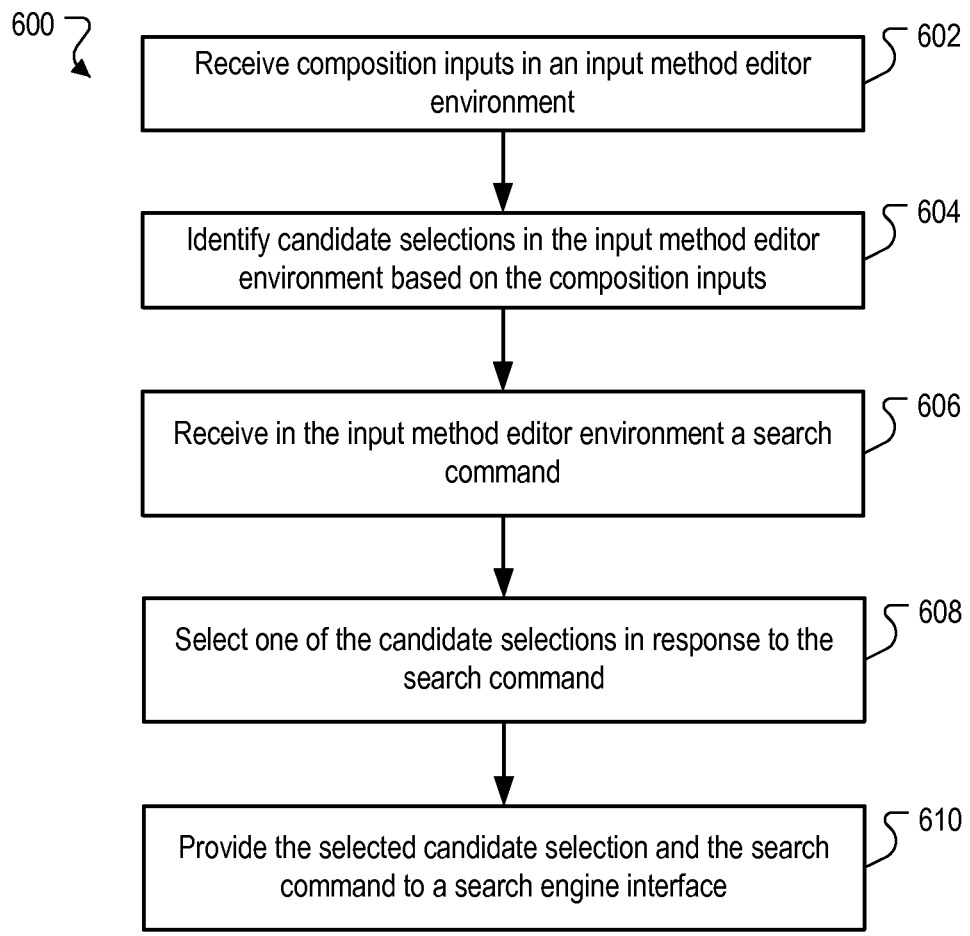
FIG. 6 is a flow diagram of an example search integration process.

FIG. 6 is a flow diagram of an example search integration process 600. The process 600 can, for example, be implemented in the device 100 of FIG. 1 and/or in the input method editor system 120 of FIG. 2.

The process 600 receives composition inputs in an input method editor environment (602). For example, the device 100 of FIG. 1 implementing an input method editor and/or the input method editor system 120 of FIG. 2 can receive composition inputs based on user inputs from a keyboard device.

The process 600 identifies candidate selections in the input method editor environment based on the composition inputs (604). For example, the device 100 of FIG. 1 implementing an input method editor and/or the input method editor system 120 of FIG. 2 can identify candidate selections, such as the candidate selections shown in FIGS. 3-5.

The process 600 receives in the input method editor environment a search command (606). For example, the device 100 of FIG. 1 implementing an input method editor and/or the input method editor system 120 of FIG. 2 can receive a search command. The search command can, for example, be generated by a command button in an input method editor environment, or can be generated by a keyboard input when the input method editor environment is active.

The process 600 selects one of the candidate selections in response to the search command (608). For example, the device 100 of FIG. 1 implementing an input method editor and/or the input method editor system 120 of FIG. 2 can perform a default selection of a first ranked candidate selection upon receiving a search command, or can select a user selected candidate selection upon receiving a search command.

The process 600 provides the selected candidate selection and the search command to a search engine interface (610). For example, the device 100 of FIG. 1 implementing an input method editor and/or the input method editor system 120 of FIG. 2 can provide the candidate selection and the search command to a search engine interface 130*a*, e.g. a search engine application program interface, or a script that is executed and that launch a web browser resolved to a search engine interface page, etc. The search engine interface can facilitate communication with a corresponding search engine application or application environment that is external to the input method editor environment.

Figure 7:
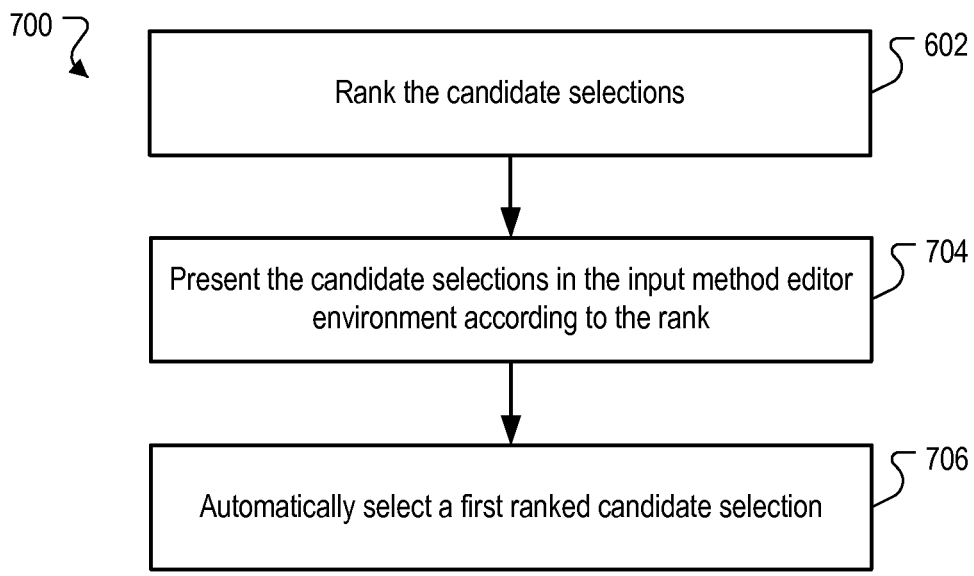
FIG. 7 is a flow diagram of a process for selecting a candidate selection.

FIG. 7 is a flow diagram of a process 700 for selecting a candidate selection. The process 700 can, for example, be implemented in the device 100 of FIG. 1 and/or in the input method editor system 120 of FIG. 2.

The process 700 ranks the candidate selections (702). For example, the device 100 of FIG. 1 implementing an input method editor and/or the input method editor system 120 of FIG. 2 can rank the candidate selections in response to composition inputs. The ranking can, for example, be based on a likelihood that the candidate selections correspond to the composition inputs.

The process 700 presents the candidate selections in the input method editor environment according to the rank (704). For example, the device 100 of FIG. 1 implementing an input method editor and/or the input method editor system 120 of FIG. 2 can present the candidate selections in an input method editor environment as shown in FIGS. 3-5.

The process 700 automatically selects a first ranked candidate selection (706). For example, the device 100 of FIG. 1 implementing an input method editor and/or the input method editor system 120 of FIG. 2 can generate a default selection of the first ranked candidate selection, as shown in FIGS. 3 and 4. Upon receiving an integration command, the first candidate selection can be selected.

Although described in the context of particular language and input method examples, the systems and methods described herein can be used for any language that utilizes a logographic script. For example, the systems and methods described herein can be used for many other languages that include ideograms, such as the Japanese language, the Korean language, and other languages.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
   receiving, at a computing device including one or more processors, one or more typed keys via a keyboard associated with the computing device, the one of more typed keys representing one or more characters in a first language, respectively;
   identifying, at the computing device, candidate selections in an input method editor environment based on the one or more characters in the first language, each candidate selection comprising one or more ideograms in a second language that is a transliteration of the first language;
   receiving, at the computing device, in the input method editor environment, a search command, the search command based on a user input;
   selecting, at the computing device, one of the candidate selections in response to the search command;
   providing, at the computing device, the selected candidate selection and the search command to a search engine interface external to the input method editor environment;
   in response to the search command, determining when the search engine interface is active;
   when the search engine interface is determined to be active:
      providing the selected candidate selection to the search engine interface as a search input, and
      invoking a search in the search engine interface; and
   when the search engine interface is determined to be inactive:
      instantiating the search engine interface,
      providing the selected candidate selection to the search engine interface as the search input, and
      invoking the search in the search engine interface.

2. The method of claim 1, wherein:
   the one or more characters in the first language are Pinyin characters and the second language is a Chinese language,
   identifying the candidate selections comprises identifying Hanzi characters for the one or more ideograms based on Pinyin inputs represented by the one or more characters; and
   providing the selected candidate selection and the search command to a search engine interface comprises providing selected Hanzi characters as a search input to the search engine interface.

3. The method of claim 1, wherein selecting one of the candidate selections in response to the search command comprises manually selecting one of the candidate selections.

4. The method of claim 1, comprising:
   ranking, at the computing device, the candidate selections in the input method editor;
   presenting, at the computing device, the candidate selections in the input method editor environment according to the rank; and
   wherein selecting one of the candidate selections in response to the search command comprises:
   automatically selecting a first ranked candidate selection.

5. A computer-implemented method, comprising:
   storing, in an input method editor data store at a computing device including one or more processors, integration commands, each integration command identifying an integration of the input method editor with a corresponding application environment that is external to an input method editor user interface;
   identifying, at the computing device, candidate selections in the input method editor user interface, the candidate selections based on one or more typed keys via a keyboard associated with the computing device, the one or more typed keys indicating one or more characters in a first language, respectively, each candidate selection comprising one or more ideograms in a second language that is a transliteration of the first language;
   receiving, in the input method editor user interface at the computing device, a specific integration command, the specific integration command based on a user input and corresponding to one of the stored integration commands;
   selecting, at the computing device, one of the candidate selections in response to the specific integration command;

providing, at the computing device, the selected candidate selection to the corresponding application environment external to the input method editor user interface;

in response to the specific integration command, determining when the corresponding application environment is active;

when the corresponding application environment is determined to be active:
   providing the selected candidate selection to the corresponding application environment, and
   invoking an application function that utilizes the selected candidate selection as input; and when the corresponding application environment is determined to be inactive:
   instantiating the corresponding application environment,
   providing the selected candidate selection to the corresponding application environment, and
   invoking the application function that utilizes the selected candidate selection as input.

6. The method of claim 5, wherein:
the one or more characters in the first language are Pinyin characters and the second language is a Chinese language,
identifying the candidate selections comprises identifying Hanzi characters as the one or more ideograms based on Pinyin inputs represented by the one or more characters; and
providing the selected candidate selection and the specific integration command to the corresponding application interface comprises providing selected Hanzi characters as a search input to a search engine interface.

7. The method of claim 5, wherein:
the application comprises a search engine user interface; and
the application function comprises a search operation.

8. The method of claim 5, wherein:
the application comprises an e-mail application; and
the application function comprises an e-mail composition function.

9. The method of claim 5, comprising:
identifying, at the computing device, a context defined by candidate selections; and
identifying, at the computing device, integration commands related to the identified context; and
enabling, at the computing device, the identified integration commands.

10. The method of claim 5, comprising:
simultaneously presenting, at the computing device, a plurality of integration command activation elements.

11. A system, comprising:
a computing device having one or more processors;
a data store storing one or more input method editor integration commands, each integration command identifying an integration of an input method editor with a corresponding application instance that is external to an input method editor user interface;
a plurality of application interfaces, each application interface associated with one of the corresponding application instances and configured to facilitate data communication from the input method editor to the application instance; and
an input method editor configured to:
   identify candidate selections based on one or more typed keys via a keyboard associated with the computing device, the one or more typed keys indicating characters in a first language, respectively, the candidate selections comprising one or more ideograms in a second language that is a transliteration of the first language;
   in response to receiving an integration command associated with an application interface, access the application interface, select one of the candidate selections, and provide the selected candidate selection to the corresponding application instance associated with the application interface;
   in response to the integration command, determine when the corresponding application instance is active;
   when the corresponding application instance is determined to be active:
     provide the selected candidate selection to the corresponding application instance, and
     invoke an application function that utilizes the selected candidate selection as input; and
   when the corresponding application instance is determined to be inactive:
     instantiating the corresponding application instance,
     providing the selected candidate selection to the corresponding application instance, and
     invoking the application function that utilizes the selected candidate selection as input.

12. The system of claim 11, wherein each application interface is configured to instantiate its corresponding application instance in response to the input method editor receiving an integration command associated with the application interface.

13. The system of claim 12, wherein the one or more characters in the first language are Pinyin characters and the second language is a Chinese language, wherein the one or more ideograms are Hanzi characters, and wherein the one or more characters are represent Pinyin inputs.

14. The system of claim 12, wherein the selected candidate selection is a user selected candidate selection.

15. The system of claim 11, wherein the input method editor is further configured to:
identify contexts defined by candidate selections;
identify integration commands related to the identified contexts; and
enable the identified integration commands.

16. The system of claim 15, wherein the identified context is a city context, and the integration command related to the identified context is a weather data command.

17. The system of claim 15, wherein the identified context is a stock context, and the integration command related to the identified context is a financial data command.

* * * * *